(12) United States Patent
Moncarz et al.

(10) Patent No.: US 12,241,018 B2
(45) Date of Patent: Mar. 4, 2025

(54) HIGH THERMAL COEFFICIENT SLURRY COMPOSITIONS AND METHODS THEREFOR

(71) Applicant: XGS Energy, Inc., Palo Alto, CA (US)

(72) Inventors: Piotr D. Moncarz, Palo Alto, CA (US); Daniel Bour, Granite Falls, WA (US); Gerald Fuller, Palo Alto, CA (US); Walter Kolbe, Palo Alto, CA (US); Freddie Lynne Sabins, Spring, TX (US)

(73) Assignee: XGS Energy, Inc., Palo Alto, CA (US)

( * ) Notice: Subject to any disclaimer, the term of this patent is extended or adjusted under 35 U.S.C. 154(b) by 0 days.

(21) Appl. No.: 18/786,371

(22) Filed: Jul. 26, 2024

(65) Prior Publication Data

US 2024/0400884 A1 Dec. 5, 2024

Related U.S. Application Data

(63) Continuation of application No. PCT/US2023/061251, filed on Jan. 25, 2023.

(60) Provisional application No. 63/305,639, filed on Feb. 1, 2022.

(51) Int. Cl.
*C09K 8/504* (2006.01)
*E21B 33/14* (2006.01)

(52) U.S. Cl.
CPC ............ *C09K 8/5045* (2013.01); *E21B 33/14* (2013.01)

(58) Field of Classification Search
CPC . C09K 8/03; C09K 8/40; C09K 8/592; C09K 5/14; C09K 8/467; C09K 8/5045; E21B 43/26; E21B 33/14
See application file for complete search history.

(56) References Cited

U.S. PATENT DOCUMENTS

| 827,437 | A | 7/1906 | Giles |
| 860,772 | A | 7/1907 | Taylor et al. |
| 3,058,909 | A | 10/1962 | Kern |
| 3,163,219 | A | 12/1964 | Wyant et al. |
| 6,251,179 | B1 | 6/2001 | Allan |
| 6,668,554 | B1 | 12/2003 | Brown |

(Continued)

FOREIGN PATENT DOCUMENTS

| WO | 2014092940 A1 | 6/2014 |
| WO | 2022018674 A1 | 1/2022 |
| WO | 2024044251 A1 | 2/2024 |

OTHER PUBLICATIONS

PCT International Search Report and Written Opinion of the International Searching Authority dated May 19, 2023.

(Continued)

*Primary Examiner* — Zakiya W Bates
(74) *Attorney, Agent, or Firm* — Martin Fessenmaier; Umberg Zipser LLP

(57) ABSTRACT

A high-thermal conductivity slurry composition is contemplated that includes a slurry mixture comprising a high-thermal k material, water, and an optional dispersant. Preferably, the high thermal k material is in the form of a plurality of particles having a wide size distribution that spans across at least 2 log units and is present in an amount effective such that the slurry composition has, upon compaction or settling of the slurry mixture at a target location, a thermal conductivity of at least 3 W/m° K.

20 Claims, 5 Drawing Sheets

(56) References Cited

U.S. PATENT DOCUMENTS

| | | |
|---|---|---|
| 6,672,371 B1 | 1/2004 | Amerman et al. |
| 7,067,004 B2 | 6/2006 | Matula et al. |
| 7,452,417 B2 | 11/2008 | Matula et al. |
| 8,272,437 B2 | 9/2012 | Bour et al. |
| 8,584,753 B2 | 11/2013 | Fitzpatrick et al. |
| 8,616,000 B2 | 12/2013 | Parrella |
| 8,640,772 B2 | 2/2014 | Bour et al. |
| 9,091,460 B2 | 7/2015 | Parrella, Sr. |
| 9,149,439 B2 | 10/2015 | Patel et al. |
| 9,376,885 B2 | 6/2016 | Bour et al. |
| 9,845,423 B2 | 12/2017 | Frantz et al. |
| 9,896,619 B2 | 2/2018 | Nguyen et al. |
| 10,113,106 B2 | 10/2018 | Wadekar |
| 10,927,604 B2 | 2/2021 | Danko |
| 10,954,924 B2 | 3/2021 | Moncarz et al. |
| 11,085,671 B2 | 8/2021 | Gheysens |
| 11,125,471 B2 | 9/2021 | Marsh et al. |
| 11,220,882 B2 | 1/2022 | Nevison et al. |
| 11,299,970 B2 | 4/2022 | Cook |
| 11,656,002 B2 | 5/2023 | Nevison et al. |
| 2003/0187583 A1 | 10/2003 | Martin et al. |
| 2006/0081155 A1 | 4/2006 | Chatterji et al. |
| 2006/0210631 A1 | 9/2006 | Patel et al. |
| 2007/0125274 A1 | 6/2007 | Miller |
| 2007/0163805 A1 | 7/2007 | Trevisani |
| 2007/0235192 A1 | 10/2007 | Michaux et al. |
| 2008/0223041 A1 | 9/2008 | Reynolds |
| 2009/0211757 A1 | 8/2009 | Riley |
| 2011/0232858 A1 | 9/2011 | Hara |
| 2012/0247766 A1 | 10/2012 | Hemmings |
| 2013/0143777 A1 | 6/2013 | Wang |
| 2017/0158934 A1* | 6/2017 | Liu ........................ C08G 73/10 |
| 2018/0273825 A1 | 9/2018 | Brown et al. |
| 2020/0191444 A1 | 6/2020 | Nevison et al. |
| 2021/0071063 A1 | 3/2021 | Stone |
| 2021/0348804 A1 | 11/2021 | Marsh et al. |
| 2021/0356174 A1 | 11/2021 | Alharbi et al. |
| 2021/0396430 A1 | 12/2021 | Cook et al. |
| 2022/0010668 A1 | 1/2022 | Vargo, Jr. et al. |
| 2024/0228868 A1 | 7/2024 | Werries et al. |

OTHER PUBLICATIONS

PCT Notification of Transmittal of International Preliminary Report on Patentability dated May 21, 2024.

* cited by examiner

HIGH THERMAL COEFFICIENT SLURRY COMPOSITIONS AND METHODS THEREFOR

This application claims priority to US provisional patent application with the Ser. No. 63/305,639, which was filed Feb. 1, 2022, and which is incorporated by reference herein.

FIELD OF THE INVENTION

The field of the invention is compositions and methods for heat transfer in geologic heat recovery, and particularly as it relates to compositions with high thermal conductivity that can be deployed/installed in a wellbore at ultra-high temperatures.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Geothermal wells have been used to provide heating and cooling systems that transfer heat to and from the ground. In a typical vertical closed well loop system, two pipes joined by a U-shaped connector at the bottom, forming a continuous casing, are placed vertically in a wellbore drilled in a subterranean formation (see U.S. Pat. App. Pub. No. 2012/0247766). This type of system is generally used for heating and cooling residential and commercial buildings. Here, conventional grout mixtures are clay-based and pumped into a wellbore to fill the annular space between the casing and the formation. The resulting grout forms a seal to prevent contamination of the subsurface from above ground, as well as preventing groundwater contamination. The grout mixture may further include thermally conductive materials to aid in transferring heat between the working fluid in the casing and the target location, and a working fluid may be circulated through the well loop to transfer heat to and from a heat exchanger at the surface.

In most cases, conventional grout mixtures are curable in the presence of heat. While conventional geothermal wells are effective for providing heating and cooling to a location proximate to the well (e.g., heat exchangers) through heat transfer at shallow depths below the surface, geothermal system wells for geothermic power production require significantly greater depths (e.g., at least 500 feet) underground and/or proximity to a known geothermic hot zone (e.g., tectonic plate boundaries) to reach a target location suitable for obtaining the heat energy necessary for power generation. These target locations may exhibit extreme temperatures (e.g., 300° C.) which will lead to premature setting of conventional grout mixtures and typically fail to provide sufficiently high thermal conductivity to render power generation effective or even feasible.

Moreover, due to the need for grout mixtures to cure after placement in the conventional geothermal wells, the grout mixtures typically contain significant amounts of curable materials (e.g., cementitious materials) for hardening of the grout mixture. Unfortunately, because these curable materials do not exhibit high-thermal conductivity, a significant portion of the grout composition lacks thermal conductivity at best, or acts as an insulator at worst, even when the grout composition contains some thermally conductive materials. Therefore, all or almost all of the grout compositions formed from conventional grout mixtures are neither capable of efficiently conducting heat energy required for power generation nor capable of remaining workable during installation at the extreme temperatures (e.g., 300° C.) near a target location (e.g., geothermal energy source) for power production.

Particulate mixtures that are free of curable materials have been utilized in certain subsurface applications, such as plugging underground pipes (see e.g., U.S. Pat. Nos. 6,715, 543 and 7,258,174). While these particulate mixtures are free of curable materials, the particulate mixtures lack high-thermal conductivity and are typically not suitable for installation at the extreme temperatures (e.g., 300° C.) near the target location (e.g., geothermal energy source). On the other hand, certain grout mixtures have been disclosed in U.S. Pat. App. No. 2021/0071063 that comprised a curable component in combination with thermally conductive material having a plurality of particle sizes to so form a hardened thermally conductive material with a low permeability. Once more, however, such mixtures are generally not suitable for heat harvesting where the extracted heat is used for power generation due to still relatively low thermal k.

U.S. Pat. App. No. 2011/0232858 teaches systems and methods in which heat for power production is extracted from a geologic formation having high temperatures (e.g., 500° C.) in which one or more bore holes contain a thermally conductive compacted filler that conducts heat to a piping system at a target location. Here, the compacted filler is graphite formulated as a powder or as a rod. To reduce the incidence of void spaces that can act as an insulator, the '858 application relies on high pressure compaction. Therefore, while multiple and/or extensive carbon-filled conduits in the formation can be formed, heat transfer to the working fluid of a tube-in-tube system is typically limited to the terminal portion of the system (as the compaction pressure would otherwise crush the tube-in-tube system), thereby significantly reducing overall heat harvest. Heat harvest can be increased with multiple graphite filled channels that converge at the tube-in-tube system, but such increase also increases operational complexity and cost.

Thus, even though various compositions for geothermal heat transfer compositions are known in the art, all or almost all of them suffer from several drawbacks. Therefore, there remains a need for high-thermal conductivity compositions and methods for the same.

SUMMARY OF THE INVENTION

The inventive subject matter is directed to various high-thermal conductivity slurry compositions and methods of producing a pumpable slurry forming such high-thermal conductivity compositions. Advantageously, the high-thermal conductivity composition is formed from a typically non-cementitious slurry mixture that may be utilized for encasement applications in heat harvesting wells, and especially closed loop geothermal system wells for geothermic power production. Contemplated high-thermal conductivity composition allow for simple deployment, provide improved heat transfer from a target location on a per unit length basis in the wells, and maintain structural integrity even after seismic events. The so improved heat transfer results in greater thermal energy capture into a working fluid, thereby increasing revenue generation for power generating wells.

In one aspect of the inventive subject matter, the inventors contemplate a high-thermal conductivity slurry composition that includes a slurry mixture. The slurry mixture comprises a high-thermal k material in form of a plurality of particles having a wide size distribution that enable tight settling/compaction at a target location to so thermally couple the formation with a casing, and an optional dispersant. In various embodiments, the slurry mixture has upon addition of water a sedimentation rate of the plurality of particles that allows pumping the slurry mixture to the target location without substantial settling of the particles before reaching the target location.

It is contemplated that the high thermal k material is in form of a plurality of particles having a wide size distribution spanning across at least 2 log units or at least 3 log units. In various embodiments, the wide size distribution is between 0.1 µm and 5.0 mm. In further embodiments, it is contemplated that the high-thermal k material may be present in an amount effective such that the slurry composition has, upon compaction or settling of the slurry mixture at a target location, a thermal conductivity of at least 3 W/m° K, at least 3 W/m° K, or at least 10 W/m° K. Among other choices, suitable high-thermal k materials include graphite powder, flaked graphite, pyrolytic graphite, desulfurized petroleum coke, graphene, fly ash, copper powder, aluminum nitride, and/or silicon carbide. Most typically, the high-thermal k material will be present in the slurry mixture in an amount of at least 10 wt. % by volume, or at least 30 wt % by volume. In certain embodiments, the slurry mixture may also include at least one functional agent and contemplated functional agents include a plasticizer, a surfactant, an organic polymer, a silica filler, NaCl or KCl or other inorganic salt, and a clay.

Referring to a pumpable slurry, it is preferred that the pumpable slurry includes the high-thermal conductivity slurry composition in admixture with water. The pumpable slurry will typically have a density of between 10 and 30 lb/gal and/or may have a water content of between 1 and 20 gal/100 lbs of high thermal k material. As will be readily appreciated, the pumpable slurry may be produced by combining the high-thermal conductivity slurry composition with a quantity of water and mixing the water with the high-thermal conductivity slurry composition to thereby form the pumpable slurry. In various embodiments, the quantity of water is sufficient to generate a slurry density of between 10 and 30 lb/gal. It is further contemplated that the pumpable slurry may be fed to a pump that pumps the pumpable slurry into the wellbore. Most typically, the pumpable slurry will be pumped into the wellbore at a rate that allows at least partial compaction or settling of the slurry mixture at the target location.

Referring to installation of the high-thermal conductivity composition, a method of installing will include a step of pumping the pumpable slurry to a target location, which will typically have a target temperature of at least 300° C. The pumpable slurry is preferably routed into an annular space between the wellbore and a casing located in the wellbore, thereby displacing a fluid in the annular space. In some embodiments, the target location may be at least 3,000 ft below ground and/or may extend in a substantially vertical orientation.

Contemplated methods further include a step of removing the displaced fluid through a return space located within the casing. The return space located within the casing may be enclosed in a secondary conduit that is located within the casing, and a second annular space may be formed between the casing and the secondary conduit. To this end, the step of removing the displaced fluid through the return space may use a secondary fluid that moves from the second annular space to the return space.

Contemplated methods may further include a step of allowing the pumpable slurry to settle or compact in at least a portion of the annular space to thereby form the high-thermal conductivity composition in the wellbore. It is contemplated that the high-thermal conductivity composition is in thermal exchange with at least a portion of the casing and at least a portion of a formation surrounding the wellbore. To this end, the pumpable slurry is pumped in place and after placement allowed undergo at least partial compaction (by passive settling or active compression) of the slurry at the target location.

In certain embodiments, it is contemplated that the formation includes a plurality of fissures that are at least partially filled with a high-thermal k material and that the high-thermal k material in the fissures will be in thermal exchange with the compacted high-thermal conductivity composition in the wellbore. Among other choices, suitable high-thermal k materials in the fissures include graphite powder, flaked graphite, pyrolytic graphite, desulfurized petroleum coke, graphene, fly ash, copper powder, aluminum nitride, and silicon carbide.

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
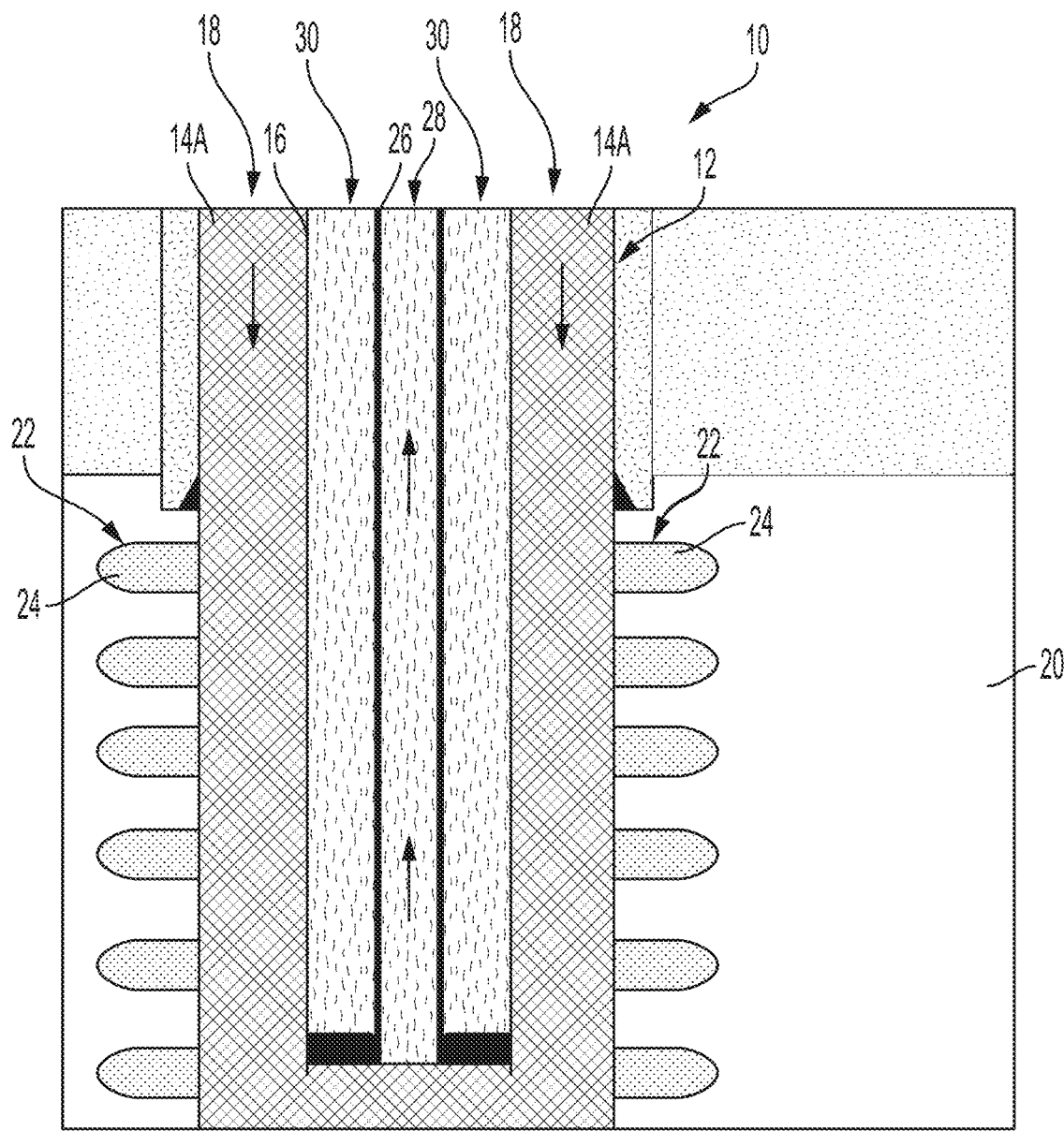
FIG. 1 is a schematic view illustrating an embodiment of a geothermal well including a wellbore during placement of a pumpable slurry.

The inventors have discovered various compositions for a high-thermal conductivity slurry and methods of producing a pumpable slurry including the same, along with methods of installing a high-thermal conductivity composition including the same. Advantageously, the high-thermal conductivity slurry composition is pumpable and formed from a slurry mixture that may be utilized for encasement applications in heat harvesting wells, such as closed loop geothermal system wells and has a thermal conductivity suitable for power production. Moreover, contemplated compositions will not require curable materials (e.g., cementitious materials), which in turn results in improved workability of the pumpable slurry and greater thermal efficiency of the high-thermal conductivity composition, thereby increasing revenue generation for power producing wells. Therefore, it should be appreciated that in at least some embodiments, contemplated compositions will not exhibit any hardening or curing that is due to hydration of cementitious materials. Consequently, contemplated compositions will remain deformable or movable without crack formation and/or loss of contact with the wellbore or casing.

In most typical aspect of the inventive subject matter, the slurry mixture of the high-thermal conductivity slurry composition includes a high-thermal k material and an optional dispersant, wherein the high thermal k material is in form of a plurality of particles having a wide size distribution that spans across at least 2 log units, at least 2.5 log units, or at least 3 log units. In this context it should be appreciated that the wide size distribution of the high thermal k material will stabilize the form or configuration of the high-thermal conductivity composition upon compaction or settling of the slurry mixture without the use of curable materials (e.g., cementitious materials), thereby reducing permeability of a liquid through the high-thermal conductivity composition as compared to compositions including particles having a narrow size distribution. The terms "compaction" and/or "settling" as utilized herein mean that the compacted or settled slurry mixture has (a) a decreased water content in an amount of at least 1 wt. %, 2 wt. %, 3 wt. %, 4 wt. %, 5 wt. %, 10 wt. %, 15 wt. %, 20 wt. %, 30 wt. %, 40 wt. %, 50 wt. %, 60 wt. %, 70 wt. %, 80 wt. % 90 wt. %, or 99 wt. % as compared to the slurry mixture prior to compaction or settling, (b) an increased density in an amount of at least 1 wt. %, 2 wt. %, 3 wt. %, 4 wt. %, 5 wt. %, 10 wt. %, 15 wt. %, 20 wt. %, 30 wt. %, 40 wt. %, 50 wt. %, 60 wt. %, 70 wt. %, 80 wt. % 90 wt. %, 100 wt. %, or even more as compared to the slurry mixture prior to compaction or settling, or (c) both (a) the decrease in water content and (b) the increase in density, while remaining moveable in the presence of substantial forces (e.g., earthquakes). Moreover, it should be noted that in some instances contemplated slurry compositions may settle over time without need of an active compaction step, while the slurry compositions in other instances may be actively compacted (e.g., via pressure increase at the target location).

The distribution of particle sizes in the slurry mixture of the high thermal k material may be expressed by the concept of sorting. The concept of sorting may be a qualitative measure of the degree of variation, or the range of variation, of different particle sizes in a mixture of unconsolidated matter (e.g., the high thermal k material of the slurry mix). A poorly sorted mixture of unconsolidated matter may include a large spectrum of particle sizes, for example particles in the size ranges of gravel, sand, silt, and clay. In comparison, a moderately sorted mixture of unconsolidated matter may include a small spectrum of particle sizes, for example medium sand and fine sand, while a very well sorted mass may include only one relatively homogenous particle size, for example coarse silt. In view of the foregoing, the slurry mixture may include a poorly sorted mixture of the high thermal k material which upon compaction or settling of the slurry mixture exhibits a reduced permeability of a liquid through the high-thermal conductivity composition as compared to compositions including particles having at least a moderately sorted mixture of unconsolidated matter. In various embodiments, the high thermal k material may have an average particle size of between 0.1 µm and 5.0 mm.

After compaction or settling of the slurry mixture, it is contemplated that the high thermal k material of the high-thermal conductivity composition will settle or be packed together in a manner such that the wide size distribution of the high thermal k material minimizes migration of a fluid through the high-thermal conductivity composition. In various embodiments, the high-thermal conductivity composition has a permeability of no greater than 1 Darcy, no greater than 0.1 Darcy, no greater than 0.01 Darcy, no greater than 0.001 Darcy, or no greater than 0.0001 Darcy, in accordance with ASTM D4630-19. According to ASTM D4630-19, 1 Darcy is equivalent to a fluid of viscosity 1 cp that flows through a porous medium at a rate of 1 $cm^3/s/1$ $cm^2$ cross-sectional area at a pressure differential of 1 atm/1 cm of length. In that context, it should be appreciated that this metric is a deemed a proxy metric for inter-particle contact (with lower Darcy numbers indicating larger inter-particle contact), which in turn is a representation of thermal conductivity across the particles.

With respect to the particle size distribution of the high-thermal k material particles it is generally contemplated that the size distribution will be effective to form a fluid seal in the annular space between the wellbore and the casing of a heat harvester in the wellbore. Typical size distributions are described in U.S. Pat. Nos. 6,715,543 and 7,528,174, both incorporated by reference herein. Therefore, it is generally preferred that the particles will have average particle sizes of between 0.1 µm and 5 mm, and that at least 90% of all particles will have an average particle size that falls within a size range spanning at least two, or at least three, or at least four orders of magnitude. For example, suitable average particle size ranges will be between 0.1 mm and 10 mm, or between 50 µm and 5 mm, or between 5 µm and 5 mm, or between 1 µm and 1 mm, or between 10 µm and 5 mm. Moreover, it is contemplated that the particle size distribution will be such that at least 20 wt. %, or at least 25 wt. %, or at least 30 wt. %, or at least 35 wt. %, or at least 40 wt. % of all particles will fall within the lower 20%, or lower 25%, or lower 35% of the size range, while at least 10 wt. %, or at least 15 wt. %, or at least 20 wt. %, or at least 25 wt. %, or at least 30 wt. % of all particles will fall within the upper 15%, or upper 20%, or upper 25% of the size range of all particles.

Thus, the majority (at least 51%, or at least 60%, or at least 70%, or at least 75%) of the particles by weight will be in the millimeter to sub-millimeter (but above 50 µm) size range, while the remainder of the particles will be in a sub-50 µm size range. For example, about 80 percent by weight of the mass of all particles may have average particle sizes between 0.5 and 1 mm, and between 0.25 and 0.5 mm, between 0.125 and 0.25 mm, and between 0.0625-0.125 mm, while about 20 percent by weight of the mass of all particles will have average particle sizes in the range of 5-65 µm, with approximately 50% of those in the size range of about 5 µm. Viewed from a different perspective, the particle size distribution may be such that at least 45 wt. %, or at least 50 wt. %, or at least 55 wt. %, or at least 60 wt. %, or at least 65 wt. % of all particles will have a 20/40 mesh size, that at least 10 wt. %, or at least 15 wt. %, or at least 20 wt. %, or at least 25 wt. %, or at least 30 wt. % of all particles will have a 100 mesh size, that at least 7 wt. %, or at least 10 wt. %, or at least 12 wt. %, or at least 15 wt. %, or at least 20 wt. % of all particles will have a 200 mesh size, and that at least 2 wt. %, or at least 3 wt. %, or at least 4 wt. %, or at least 5 wt. %, or at least 7 wt. % of all particles will have an average particle size of less than 25 μm.

Moreover, because the high-thermal conductivity composition is in most embodiments substantially free of curable materials (e.g., cementitious materials), it should be recognized that the high-thermal conductivity composition remains moveable and/or deformable in the presence of substantial forces (e.g., earthquakes, thermal expansion and/or contraction of the casing of the heat harvesting device embedded in the high thermal k materials) for minimizing damage to the well containing the high-thermal conductivity composition. Such deformability is particularly beneficial where geological stresses or temperature swings in the heat harvesting structure would otherwise lead to cracks in the cured or hardened material. Indeed, the moveability and/or deformability of the high-thermal conductivity composition will ensure continuous contact of the high-thermal conductivity composition with the heat harvesting structure that is encased in the high-thermal conductivity composition. Furthermore, the slurry mixture of the high-thermal conductivity slurry composition has improved workability that allows placement of the slurry composition in the wells, even under extreme temperature conditions (e.g., at least 300° C.) resulting from the slurry mixture being substantially free of certain curable materials (e.g., cementitious materials). Still further, it should be recognized that due to the relatively wide size distribution, void spaces formed by larger particles will be readily filled by smaller particles and as such thermal conductivity significantly improves.

The inventors further contemplate that the high-thermal k material is present in an amount effective such that the slurry composition has, upon compaction or settling of the slurry mixture at a target location, a thermal conductivity of at least 1 W/m° K, at least 4 W/m° K, at least 10 W/m° K, at least 15 W/m° K, at least 20 W/m° K, at least 25 W/m° K, at least 35 W/m° K, and at least 40 W/m° K. Without being bound by theory, it is contemplated that the (degree of) compaction or settling of the slurry mixture resulting from the wide size distribution of the high thermal k material provides improved thermal conductivity to the high-thermal conductivity composition as compared to compositions including particles having a narrow size distribution. Therefore, and viewed from a different perspective, any given volume of settled or compacted high-thermal k material will have equal or less than 15%, equal or less than 10%, equal or less than 8%, equal or less than 6%, equal or less than 5%, equal or less than 4%, equal or less than 3%, equal or less than 2% of the given volume as a void space.

As will be readily appreciated, the high-thermal k material is used to provide improved heat conductivity of the high-thermal conductivity composition formed from the slurry mixture, and thus the ability of the geothermal well loop to more effectively extract heat during operation as compared to all or almost all known grout compositions. Suitable high-thermal k materials include, but are not limited to, graphite, sand, quartz silica, carbon nanotubes, graphene, boron nitride, brass, a brass alloy, chrome nickel steel, carbon steel, stainless steel, a transition metal (e.g., copper, cadmium, cobalt, gold, silver, iridium, iron, molybdenum, nickel, platinum, zinc, and the like), a transition metal alloy (e.g., a copper alloy, a cadmium alloy, a cobalt alloy, a gold alloy, a silver alloy, an iridium alloy, an iron alloy, a molybdenum alloy, a nickel alloy, a platinum alloy, a zinc alloy, and the like), a post-transition metal (e.g., lead, tin, and the like), a post-transition metal alloy (e.g., an lead alloy, a tin alloy, and the like), an alkaline earth metal alloy (e.g., a beryllium alloy, a magnesium alloy, and the like), or combinations thereof. In certain embodiments, the high-thermal k material is a carbon allotrope, and particularly contemplated allotropes include graphite powder, exfoliated graphite, flaked graphite, pyrolytic graphite, desulfurized petroleum coke, graphene, fly ash, copper powder, aluminum nitride, silicon carbide, and combinations thereof.

In some embodiments, the high-thermal k material may be present in the slurry mixture of the high-thermal conductivity slurry composition in an amount sufficient to provide the desired amount of thermal conductivity to the high-thermal conductivity slurry of the geothermal well. The high-thermal k material may be present in the slurry mixture in an amount of at least 5 wt. %, or 10 wt. %, or 20 wt. %, or 25 wt. %, or 30 wt. %, or 35 wt. %, or 40 wt. %, or 45 wt. %, or 50 wt. %, or 55 wt. %, or 60 wt. %, or 65 wt. %, or 70 wt. %, or 75 wt. %, or 75 wt. %, or 80 wt. %, or 85 wt. %, and even higher, based on a total weight of the slurry mixture. Alternatively, the high-thermal k material may be present in the slurry mixture in an amount of no greater than 80 wt. %, 70 wt. %, 60 wt. %, 50 wt. %, 45 wt. %, 40 wt. %, 35 wt. %, 20 wt. %, 15 wt. %, or 10 wt. %, based on a total weight of the slurry mixture. Alternatively, the high-thermal k material may be present in the slurry mixture in an amount of from about 50 to about 80 wt. %, from about 55 wt. % to about 85 wt. %, or from about 60 wt. % to about 90 wt. %, based on a total weight of the slurry mixture.

Therefore, in some embodiments, the high-thermal conductivity composition formed from the slurry mixture of the high-thermal conductivity slurry composition including the high-thermal k material has a thermal conductivity of at least 0.5 British Thermal Unit per foot per hour per Fahrenheit degree (BTU/hr·ft·° F.), at least 0.57 BTU/hr·ft·° F. (1 W/m° K), at least 1.73 BTU/hr·ft·° F. (3 W/m° K), at least 2.0 BTU/hr·ft·° F., at least 2.31 BTU/hr·ft·° F. (4 W/m° K), at least 4.0 BTU/hr·ft·° F., at least 5.78 BTU/hr·ft·° F. (10 W/m° K), at least 6.0 BTU/hr·ft·° F., at least 8.0 BTU/hr·ft·° F., at least 10 BTU/hr·ft·° F., at least 12 BTU/hr·ft·° F., at least 14 BTU/hr·ft·° F., at least 16 BTU/hr·ft·° F., at least 20 BTU/hr·ft·° F., at least 20 BTU/hr·ft·° F., at least 25 BTU/hr·ft·° F., at least 30 BTU/hr·ft·° F., or at least 40 BTU/hr·ft·° F., and even higher. Alternatively, the high-thermal conductivity composition formed from the slurry mixture including the high-thermal k material has a thermal conductivity in an amount of no greater than 30 BTU/hr·ft·° F., no greater than 25 BTU/hr·ft·° F., no greater than 20 BTU/hr·ft·° F., no greater than 18 BTU/hr·ft·° F., no greater than 16 BTU/hr·ft·° F., no greater than 14 BTU/hr·ft·° F., no greater than 12 BTU/hr·ft·° F., or no greater than 10 BTU/hr·ft·° F.

Where contemplated compositions include a dispersant, it is contemplated that the dispersant may be present in the slurry mixture of the high-thermal conductivity slurry composition and may act as a thinner or deflocculant for improving workability of the high-thermal conductivity slurry composition. In some embodiments, the dispersant may include, but is not limited to, derivatives of an acid, salts of derivatives of an acid, phosphates, sodium carbonates, polymeric or monomeric sodium silicate complexes (e.g., sodium metasilicate, water glass, and the like), lignite compounds, and low molecular weight polymers, soaps, surfactants, sulfonates, or combinations thereof.

The derivatives of an acid that may be used as dispersants in the slurry mixture may include, but are not limited to, derivatives of tannic acid, derivatives of citric acid (e.g., citrate), derivatives of humic acid, derivatives of phosphoric acid, disodium hydrogen phosphate, trisodium phosphate, dihydrogen phosphate, quebracho, derivatives of quebracho, sulfornethylated quebracho, derivatives of sulfomethylated quebracho, alkylated quebracho, derivatives of alkylated quebracho, a naphthalene sulfonic acid condensed with formaldehyde, and any combination thereof. Salts of these derivatives of an acid may also be suitable as a dispersant (e.g., a sodium salt of a derivative of an acid), including, but not limited to, sodium humate, sodium phosphate, sodium citrate, sodium tannate, and the like, and any combination thereof. Suitable phosphates for use as the dispersant may include, but are not limited to, sodium polyphosphate, tetrasodium polyphosphate, sodium tripolyphosphate, sodium hexametaphosphate, sodium acid pyrophosphate, sodium metaphosphate, sodium hexametaphosphate, and any combination thereof. Suitable lignite compounds may include, but are not limited to, lignosulfonates, lignosulfonate alkali salts (e.g., sodium, potassium, or alkaline earth metals, such as calcium, and the like), lignosolfonates of acrylic acid, causticized lignites, causticized leonardites, ferro lignosulfonates, chrome lignosulfonates, ferro-chrome lignosulfonates, transition metal lignosulfonates (e.g., zirconium lignosulfonates, titanium lignosulfonates, and the like), sulfoalkylated lignites, or combinations thereof.

Examples of suitable low molecular-weight polymers may include, but are not limited to, polyacrylates, alkaline salts of polyacrylic acid, poly(sulfonated styrene-co-maleic anhydride), poly(acrylic acid-co-vinyl sulfonic acid), alkaline salts of polymethacrylate, polyacrylamide 2-acrylamido-2-methylpropane sulfonic acid, sodium salts of polyacrylamide 2-acrylamido-2-methylpropane sulfonic acid, polymers produced from condensed naphthalene sulfonic acid sulfonated polymers, polymers of unsaturated dicarboxylic acids, polymers of monoethylenically unsaturated monocarboxylic acids, graft polymers of ethylenically unsaturated monomers and polyalkylene glycols, polymers allyloxybenzenesulfonates, polymeric alkylated salts of allyloxybenzenesulfonates, terpolymers of tetrahydrophthalic acid, acrylic acid and 2-acrylamido-2-methylpropane sulfonic acid and lignosulfonates, graft copolymers of tetrahydrophthalic acid, acrylic acid and 2-acrylamido-2-methylpropane sulfonic acid and lignosulfonates, polymeric organosilicons, and As used herein, the term "low molecular weight polymer" means a polymer with a molecular weight of less than 1,000,000.

Suitable soaps that may be used as the dispersants may include, but are not limited to, odium stearate, potassium stearate, ammonium stearate, sodium aurate, potassium aurate, sodium myristate, potassium myristate, sodium ricinoleate, potassium ricinoleate, sodium palmitate, potassium palmitate, calcium caprylate, sodium caprylate, potassium caprylate, 4,7,10,13,16,19-docosahexaenoic acid, 4,7,10,13, 16-docosapentaenoic acid, 5,8,11,14,17-eicosapentaenoic acid, 5,8,11,14-eicosatetraenoic acid, 5,8,11-eicosatrienoic acid, 6,9,12,15-octadecatetraenoic acid, 7,10,13,16,19-docosapentaenoic acid, 7,10,13,16-docosatetraenoic acid, 8,11, 14,17-eicosatetraenoic acid, 8,11,14-eicosatrienoic acid, behenic acid, capric acid, caprylic acid, cis-11-docosenoic acid, cis-11-eicosenoic acid, cis-11-octadecenoic acid, cis-15-tetracosenoic acid, cis-4-decenoic acid, cis-4-dodecenoic acid, cis-4-tetradecenoic acid, cis-5-lauroleic acid, cis-5-tetradecenoic acid, cis-6-octadecenoic acid, cis-9-decenoic acid, cis-9-dodecenoic acid, cis-9-eicosenoic acid, cis-9-hexadecenoic acid, cis-9-tetradecenoic, cis-tetracosenoic acid, caprylic acid decenoic acid, dihydroxystearic acid, docosadienoic acid, docosahexaenoic acid, docosapentaenoic acid, dotriacontanoic acid, eicosadienoic acid, eicosanoic acid, eicosapentaenoic acid, eicosatetraenoic acid, eicosatrienoic acid, eicosenoic acid, erucic acid, heptadecanoic acid, heptadecenoic acid, hexacosanoic acid, hexadecadienoic acid, hexadecenoic acid, lauric acid, linoleic acid, linolenic, myristic acid, nonadecanoic acid, nonanoic acid, octacosanoic acid, octadecatetraenoic acid, octadecatrienoic acid, oleic acid, palmitic acid, pentadecanoic acid, pentadecenoic acid, pentatriacontanoic, ricinoleic acid, stearic acid, tetracosanoic acid, tetradecenoic acid, tetratriacontanoic acid, triacontanoic acid, tridecanoic acid, tritriacontanoic acid, or combinations thereof.

Suitable sulfonates for use as the dispersant according may include, but are not limited to, a melamine sulfonate condensed with formaldehyde, a sulfonated styrene maleic anhydride copolymer, a sulfonated vinyl toluene maleic anhydride copolymer, a sodium naphthalene sulfonate condensed with formaldehyde, a sulfonated acetone condensed with formaldehyde, an interpolymer of acrylic acid, an allyloxybenzene sulfonate, an allyl sulfonate, or combinations thereof.

In some embodiments, the dispersant may be present in the slurry mixture of the high-thermal conductivity slurry composition in an amount sufficient to provide the desired amount of viscosity to the slurry mixture. The dispersant may be present in slurry mixture in an amount of at least 0.1 wt. %, 0.5 wt. %, 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the dispersant may be present in slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the dispersant may be present in slurry mixture in an amount of from about 1 to about 20 wt. %, from about 5 wt. % to about 15 wt. %, or from about 7 wt. % to about 13 wt. %, based on a total weight of the slurry mixture.

The slurry mixture of the high-thermal conductivity slurry composition may further include at least one functional agent. The functional agent may be used to modify the rheological properties of the slurry mixture in response to a variety of stimuli, such as temperature, pressure, contact with another material, or combinations thereof, or improve mixability of the slurry mixture. The functional agent may be selected from the group consisting of a plasticizer, a surfactant, an organic polymer, a silica filler, a NaCl, KCl or other inorganic salt, a clay, and combinations thereof.

The plasticizer may be present in the slurry mixture of the high-thermal conductivity slurry composition to improve workability for ease of placement. In various embodiments, the term "plasticizer" refers to a material that increases the fluidity of the slurry mixture and thereby increases the workability of the slurry mixture or permits the slurry mixture to be made with a smaller amount of water while maintaining equal workability. Suitable plasticizers may include, but are not limited to, polycarboxylic ether plasticizers, phthalate plasticizers, terephthalate plasticizers, sulfonamide plasticizers, benzoate plasticizers, phosphate plasticizers, or combinations thereof.

In some embodiments, the plasticizer may be present in the slurry mixture of the high-thermal conductivity slurry composition in an amount sufficient to provide the desired amount of workability to the slurry mixture. The plasticizer may be present in the slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the plasticizer may be present in the slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the plasticizer may be present in the slurry mixture in an amount of from about 1 to about 20 wt. %, from about 5 wt. % to about 15 wt. %, or from about 7 wt. % to about 13 wt. %, based on a total weight of the slurry mixture.

A surfactant may also be present in the slurry mixture of the high-thermal conductivity slurry composition to improve surface properties of the slurry mixture. Suitable surfactants may include, but are not limited to, a non-ionic surfactant, an anionic surfactant, a cationic surfactant, a zwitterionic surfactant, or combinations thereof.

Suitable non-ionic surfactants may include, but are not limited to, an alkyoxylate (e.g., an alkoxylated nonylphenol condensate, such as poly(oxy-1,2-ethanediyl), alpha-(4-nonylphenyl)-omega-hydroxy-branched), an alkylphenol, an ethoxylated alkyl amine, an ethoxylated oleate, a tall oil, an ethoxylated fatty acid, an alkyl polyglycoside, a sorbitan ester, a methyl glucoside ester, an amine ethoxylate, a diamine ethoxylate, a polyglycerol ester, an alkyl ethoxylate, an alcohol that has been polypropoxylated and/or polyethoxylated, a linear alcohol alkoxylate, dodecylbenzene sulfonic acid salt derivative, a linear nonyl-phenol, dioxane, ethylene oxide, polyethylene glycol, an ethoxylated castor oil, polyoxyethylene nonyl phenyl ether, tetraethyleneglycoldodecylether, ethylene oxide, decylamine oxide, dodecylamine oxide, an alkylamine oxide, an ethoxylated amide, an alkoxylated fatty acid, an alkoxylated alcohol (e.g., lauryl alcohol ethoxylate, ethoxylated nonyl phenol), an ethoxylated fatty amine, an ethoxylated alkyl amine (e.g., cocoalkylamine ethoxylate), any derivative thereof, and any combination thereof. As used herein, the term "derivative," refers to any compound that is made from one of the identified compounds, for example, by replacing one atom in the listed compound with another atom or group of atoms or rearranging two or more atoms in the listed compound.

Suitable anionic surfactants may include, but are not limited to, methyl ester sulfonate, a hydrolyzed keratin, polyoxyethylene sorbitan monopalmitate, polyoxyethylene sorbitan monostearate, polyoxyethylene sorbitan monooleate, an alkyl ether sulfate, sodium 4-(1'heptylnonyl)benzenesulfonate, sodium dioctyl sulphosuccinate, sodium octylbenzenesulfonate, sodium hexadecyl sulfate, sodium laureth sulfate, a quaternary ammonium compound (e.g., a trimethylcocoammonium chloride, a trimethyltallowammonium chloride, a dimethyldicocoammonium chloride, and the like), a cetylpyridinium chloride, an alkyl ester sulfonate, an alkyl ether sulfonate, an alkyl ether sulfate, an alkali metal alkyl sulfate, an alkyl sulfonate, an alkylaryl sulfonate, a sulfosuccinate, an alkyl disulfonate, an alkylaryl disulfonate, an alkyl disulfate, an alcohol polypropoxylated sulfate, an alcohol polyethoxylated sulfate any derivative thereof, or any combination thereof.

Suitable zwitterionic surfactants may include, but are not limited to, an alkyl amine oxide, an alkyl betaine, an alkyl amidopropyl betaine, an alkyl sulfobetaine, an alkyl sultaine, a dihydroxyl alkyl glycinate, an alkyl ampho acetate, a phospholipid, an alkyl aminopropionic acid, an alkyl imino monopropionic acid, an alkyl imino dipropionic acid, dipalmitoyl-phosphatidylcholine, an amine oxide, a betaine, a modified betaine, an alkylamidobetaine (e.g., cocoamidopropyl betaine), and any combination thereof.

As example, surfactants that may exhibit viscoelastic properties may include, but are not limited to, a sulfosuccinate, a taurate, an amine oxide (e.g., an amidoamine oxide), an ethoxylated amide, an alkoxylated fatty acid, an alkoxylated alcohol, an ethoxylated fatty amine, an ethoxylated alkyl amine, a betaine, modified betaine, an alkylamidobetaine, a quaternary ammonium compound, an alkyl sulfate, an alkyl ether sulfate, an alkyl sulfonate, an ethoxylated ester, an ethoxylated glycoside ester, an alcohol ether, any derivative thereof, and any combination thereof.

In some embodiments, the surfactant may be present in the slurry mixture of the high-thermal conductivity slurry composition in an amount sufficient to provide the desired amount of surface properties to the slurry mixture. The surfactant may be present in the slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the surfactant may be present in the slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the surfactant may be present in the slurry mixture in an amount of from about 1 to about 20 wt. %, from about 5 wt. % to about 15 wt. %, or from about 7 wt. % to about 13 wt. %, based on a total weight of the slurry mixture.

The organic polymer may be present in the slurry mixture of the high-thermal conductivity slurry composition to improve properties of the slurry mixture. Suitable organic polymers may include, but are not limited to, natural compounds, synthetic compounds, or a combination thereof. Non-limiting examples of suitable natural compounds include polysaccharides, such as polysaccharides and polysaccharide ethers which are soluble in cold water, such as cellulose ethers, starch ethers (amylose and/or amylopectin and/or derivatives thereof), guar ethers dextrins, or combinations thereof. Non-limiting examples of suitable synthetic compounds include protective colloids, for example one or more polyvinylpyrrolidones and/or polyvinylacetals, polyvinyl alcohols, melamine formaldehyde sulfonates, naphthalene formaldehyde sulfonates, block copolymers of propylene oxide and ethylene oxide, styrene-maleic acid and/or vinyl ether-maleic acid copolymers.

In some embodiments, the organic polymer may be present in the slurry mixture of the high-thermal conductivity slurry composition in an amount sufficient to provide the desired amount of properties to the slurry mixture. The organic polymer may be present in the slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the organic polymer may be present in the slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the organic polymer may be present in the slurry mixture in an amount of from about 1 to about 20 wt. %, from about 5 wt. % to about 15 wt. %, or from about 7 wt. % to about 13 wt. %, based on a total weight of the slurry mixture.

Where desired, a silica filler may be present in the slurry mixture of the high-thermal conductivity slurry composition to improve properties of the slurry mixture. Suitable silica filler may be a pyrogenic or precipitated finely-divided silica. The silica filler may have a particle size of from about 50 to 10,000 angstroms, from about 50 to about 400, or from about 100 to about 300 angstroms. The silica filler may be present in the slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the silica filler may be present in the slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the silica filler may be present in the slurry mixture in an amount of from about 1 to about 20 wt. %, from about 5 wt. % to about 15 wt. %, or from about 7 wt. % to about 13 wt. %, based on a total weight of the slurry mixture.

The inorganic salt may be present in the slurry mixture of the high-thermal conductivity slurry composition to improve mixability of the slurry mixture. Suitable inorganic salts may include, but are not limited to, NaCl, KCl, and the like. The inorganic salt may be present in the slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the inorganic salt may be present in the slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the inorganic salt may be present in the slurry mixture in an amount of from about 1 to about 20 wt. %, from about 5 wt. % to about 15 wt. %, or from about 7 wt. % to about 13 wt. %, based on a total weight of the slurry mixture.

The clay may be present in the slurry mixture of the high-thermal conductivity slurry composition to modify flowability of the slurry mixture. Suitable clay may include a member of the smectite family, a member of the palygorskite-sepiolite phyllosilicate family, a member of the kaolinite-serpentine family, nontronite, bentonite, hectorite, attapulaite, fluoromica, montmorillonite, beidellite, saponite, sepiolite, kaolinite, illite, any cation exchanged version thereof, or combinations thereof.

Of the suitable smectite family clays including nontronite, montmorillonite, saponite, hectorite, and beidellite, other suitable smectite family clays for use as the aqueous swellable clays of the present disclosure may include, but are not limited to, aliettite, ferrosaponite, sauconite, stevensite, swinefordite, volkonskoite, yakhontovite, and any combination thereof. Suitable members of the palygorskite-sepiolite pyhyllosilicate family may include, but are not limited to, attapulgite, tuperssautsiaite, windhoekite, yofortierite, falcondoite, ferrisepiolite, loughlinite, and any combination thereof. Suitable members of the kaolinite-serpentine family of aqueous swellable clays may include, but are not limited to, kaolinite, greenalite, fraipontite, halloysite, dickite, lizardite, manandonite, nacrite, cronstedtite, clinochrysotile, chrysotile, nepouite, odinite, webskyite, pecoraite, orthochrysotile, parachrysotile, caryopilite, brindleyite, berthierine, amesite, antigorite, baumite, and any combination thereof.

In some embodiments, the clay may be present in the slurry mixture of the high-thermal conductivity slurry composition in an amount sufficient to provide the desired amount of properties to the slurry mixture. The clay may be present in the slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the clay may be present in the slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the clay may be present in the slurry mixture in an amount of from about 1 to about 20 wt. %, from about 5 wt. % to about 15 wt. %, or from about 7 wt. % to about 13 wt. %, based on a total weight of the slurry mixture.

The slurry mixture of the high-thermal conductivity slurry composition may also include a variety of additives, such as a thermally insulative material, an inhibitor, an aggregate, or combinations thereof. The additives may modify the thermodynamic properties of the slurry mixture or the resulting high-thermal conductivity composition, or further modify the rheological properties of the slurry mixture.

As desired or needed, a thermally insulative material may be present in the slurry mixture of the high-thermal conductivity slurry composition to modify the thermal conductivity of the resulting high-thermal conductivity composition, which may counteract the effects of a portion of the high-thermal k material. The thermally insulative material may also be desirable in portions of the geothermal well near the surface to minimize heat transfer outside the well. Suitable thermally insulative materials may be solid particles that have low thermal conductivity. Specific examples of suitable thermally insulative materials for use in the slurry mixture may include, but are not limited to, glass (e.g., glass spheres), diatomaceous earth, vermiculite, calcium silicate, polyurethane, polyurethane foam, perlite, fiberglass, rock wool, mineral wool, cellulose, and any combination thereof.

In some embodiments, the thermally insulative material may be present in the slurry mixture of the high-thermal conductivity slurry composition in an amount sufficient to provide the desired amount of thermal insulation to the slurry mixture. The thermally insulative material may be present in slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the thermally insulative material may be present in slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the thermally insulative material may be present in slurry mixture in an amount of from about 1 to about 20 wt. %, from about 5 wt. % to about 15 wt. %, or from about 7 wt. % to about 13 wt. %, based on a total weight of the slurry mixture.

In some embodiments, the salt including a cation and an anionic may be such that the cation includes, but is not limited to, at least one of lithium, potassium, sodium, hydronium, ammonium, calcium, magnesium, a quaternary amine, magnesium, calcium, strontium, barium, titanium, cesium, vanadium, chromium, manganese, iron, cobalt, nickel, copper, zinc, aluminum, zirconium, and any combination thereof; and the anion includes, but is not limited to at least one of chloride, bromide, nitrate, iodide, hydroxide, nitirite, hexafluoroantimonate, hexafluoroarsenate, hexafluorophosphate, propionate, lactate, tartrate, phosphate, phosphonium, borate, silicate, sulfate, acetate, aluminate, chromate, dichromate, permanganate, chlorate and perchlorate, formate, or combinations thereof.

In other embodiments, the inhibitor may include a cationic oligomer or polymer. Suitable such cationic oligomers or polymers may comprise at least one monomer including, but not limited to, imine, alkylene imine, ethylene imine, propylene imine, amine, ethylene amine, an organo-amine, a quaternary amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl) trimethyl ammonium chloride, vinyl pyrrolidone, any derivative thereof, any salt thereof, or combinations thereof.

Suitable silicates for use as the inhibitor may be of any type suitable for said use including silicate salts, oligomeric silicates, polymeric silicates, and the like. Examples of suitable silicates may include, but are not limited to, an alkali earth metal silicate, an alkaline earth metal silicate, and any combination thereof, such as sodium silicate, calcium silicate, potassium silicate, sodium metasilicate, calcium metasilicate, potassium metasilicate, and the like.

In some embodiments, the inhibitor may be present in the slurry mixture of the high-thermal conductivity slurry composition in an amount sufficient to provide the desired amount of swelling reductions to one or more components of the slurry mixture. The inhibitor may be present in slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the inhibitor may be present in slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the inhibitor may be present in slurry mixture in an amount of from about 1 to about 20 wt. %, from about 5 wt. % to about 15 wt. %, or from about 7 wt. % to about 13 wt. %, based on a total weight of the slurry mixture.

The aggregate may be present in the slurry mixture of the high-thermal conductivity slurry composition as a filler. A non-limiting example of a suitable aggregate includes sand or quartz sand, such as those described in U.S. Pat. Nos. 6,715,543 and 7,258,174, which are hereby incorporated by reference in their entireties. In various embodiments, the aggregate may be in a form of a plurality of particles having a wide size distribution that spans across at least 2 log units, at least 2.5 log units, or at least 3 log units. In some embodiments, the wide size distribution of the aggregate, when combined with the high thermal k material, provides further integrity to the form or configuration of the high-thermal conductivity composition upon compaction or settling of the slurry mixture without the use of curable materials (e.g., cementitious materials) thereby reducing permeability of a liquid through the high-thermal conductivity composition as compared to compositions including particles having a narrow size distribution.

In certain embodiments, the aggregate is quartz sand. The aggregate may have an average particle size of between 0.1 μm and 5.0 mm. The aggregate may be present in slurry mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry mixture. Alternatively, the aggregate may be present in slurry mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry mixture. Alternatively, the aggregate may be present in slurry mixture in an amount of from about 1 to about 20 wt. %, from about 5 wt. % to about 15 wt. %, or from about 7 wt. % to about 13 wt. %, based on a total weight of the slurry mixture.

A method of producing a pumpable slurry is also provided. The method includes combining the high-thermal conductivity slurry composition with a quantity of water. The method further includes mixing the water with the high-thermal conductivity slurry composition to thereby form the pumpable slurry. Any method or process of mixing may be utilized including a static mixer, a rotary mixer, or a re-circulation jet mixer. The slurry mixture of the high-thermal conductivity slurry composition has upon addition of water a viscosity that allows pumping the slurry mixture to the target location having the target temperature. In certain embodiments, the slurry mixture has upon addition of water a sedimentation rate of the plurality of particles that allows pumping the slurry mixture to the target location without substantial settling of the particles before reaching the target location.

In various embodiments, the quantity of water is sufficient to generate a slurry density of between about 10 and about 30 lbs/gal, between about 12 and about 25 lbs/gal, or between about 14 and about 16 lbs/gal. Alternatively, the quantity of water is sufficient to generate a slurry density of at least 10 lbs/gal, at least 12 lbs/gal, at least 14 lbs/gal, at least 16 lbs/gal, at least 18 lbs/gal, at least 20 lbs/gal, at least 22 lbs/gal, at least 24 lbs/gal, at least 26 lbs/gal, or at least 28 lbs/gal. Alternatively, the quantity of water is sufficient to generate a slurry density of no greater than 30 lbs/gal, no greater than 28 lbs/gal, no greater than 26 lbs/gal, no greater than 24 lbs/gal, no greater than 22 lbs/gal, no greater than 20 lbs/gal, no greater than 18 lbs/gal, no greater than 16 lbs/gal, no greater than 14 lbs/gal, or no greater than 12 lbs/gal.

The pumpable slurry may have a water content of 1 and 50 gal/100 lbs of high thermal k material, 1 and 40 gal/100 lbs of high thermal k material, 1 and 30 gal/100 lbs of high thermal k material, 1 and 20 gal/100 lbs of high thermal k material, or 10 and 20 gal/100 lbs of high thermal k material. Alternatively, the pumpable slurry may have a water content of at least 1 gal/100 lbs of high thermal k material, at least 5 gal/100 lbs of high thermal k material, or at least 10 gal/100 lbs of high thermal k material. Alternatively, the pumpable slurry may have a water content of no greater than 50 gal/100 lbs of high thermal k material, no greater than 40 gal/100 lbs of high thermal k material, or no greater than 30 gal/100 lbs of high thermal k material.

Figure 2:
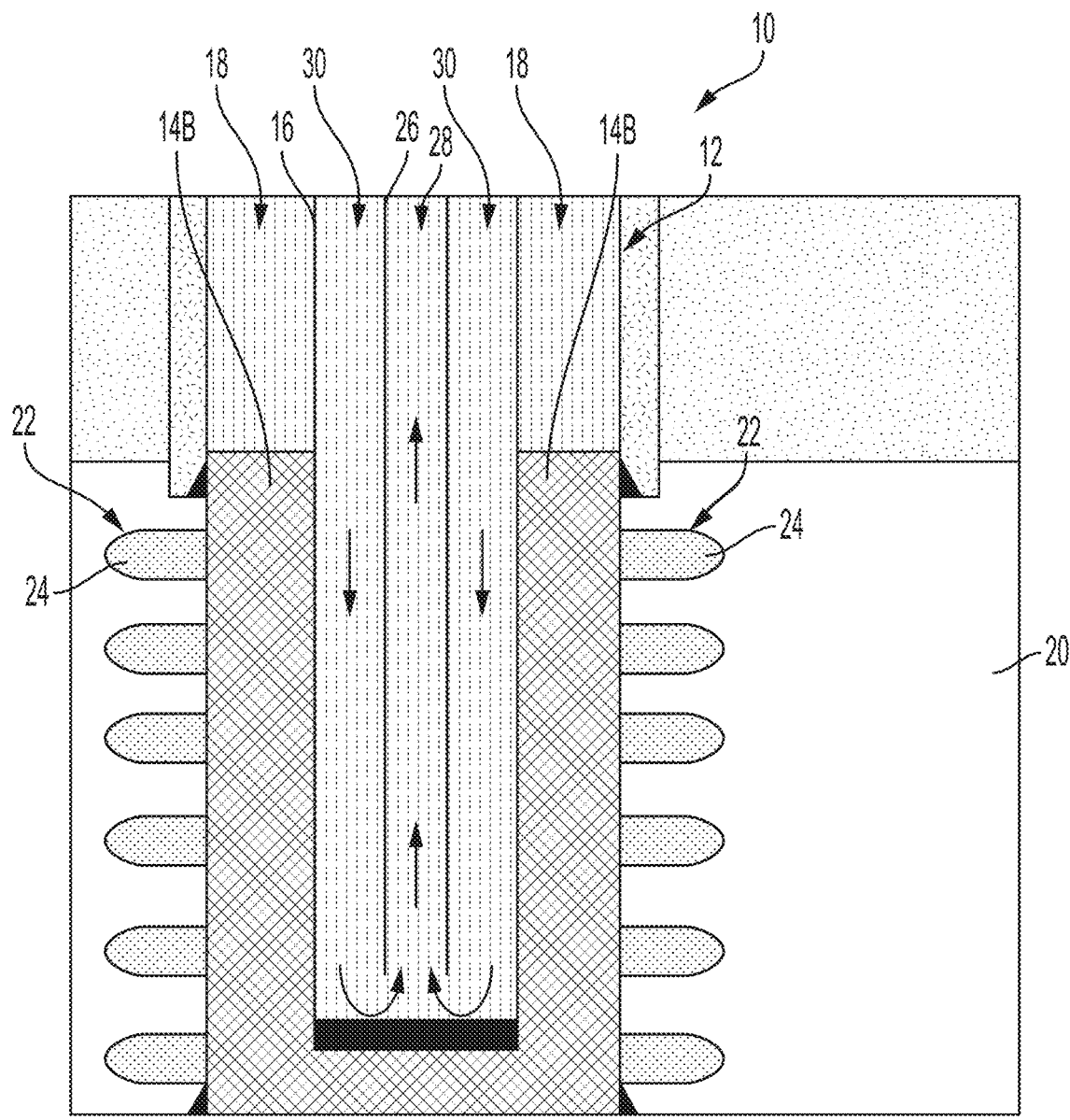
FIG. 2 is a schematic view illustrating an embodiment of the geothermal well of FIG. 1 after at least partial compaction or settling of the pumpable slurry.

FIG. 1 and FIG. 2 are schematic views illustrating embodiments of a geothermal well 10 including a wellbore 12 during placement of a pumpable slurry 14A (FIG. 1) and after at least partial compaction or settling of the pumpable slurry 14A to form a high-thermal conductivity composition 14B (FIG. 2). The geothermal well 10 further includes a casing 16 located in the wellbore 12 such that an annular space 18 is formed between the wellbore 12 and a casing 16. The pumpable slurry 14A is pumped through (FIG. 1) or located in (FIG. 2) the annular space 18 of the wellbore 12. The geothermal well 10 is formed within a geological formation 20. Upon at least partial compaction or settling, the pumpable slurry 14A forms the high-thermal conductivity composition 14B. In this context, it should be appreciated that the high-thermal conductivity composition 14B in FIG. 2 is in thermal exchange with at least a portion of the casing 16 and at least a portion of the formation 20 surrounding the wellbore 12 via the high-thermal k material 24 in the fissures 22. As mentioned above, the high thermal k material is in form of a plurality of particles (which may have a wide size distribution) in the wellbore and fissures, which substantially improves thermal contact of the casing 16 with the high temperature formation at the target location, while remaining moveable to minimize damage in the presence of substantial forces (e.g., earthquakes, thermal expansion and contraction).

The geothermal well 10 may be connected to a circulating pump (not shown) at the surface above the formation 20. In preferred embodiments, the formation 20 includes a plurality of fissures 22 that are at least partially filled with a high-thermal k material 24. In this context it should be noted that the high-thermal k material 24 in the fissures 22 is in thermal exchange with the high-thermal conductivity composition 14B in the wellbore 12 and is typically comprised of the same material. Among other suitable materials, high-thermal k material 24 in the fissures 22 may be graphite powder, flaked graphite, pyrolytic graphite, desulfurized petroleum coke, graphene, fly ash, copper powder, aluminum nitride, silicon carbide, and any reasonable combination thereof. It is also to be appreciated that as the pumpable slurry 14A is routed through the annular space 18 of the wellbore 12 as shown in FIG. 1, the high-thermal k material 24 is obtained from the pumpable slurry 14A. Viewed from a different perspective, the pumpable slurry 14A in annular space 18 comprise the same material as the high-thermal k material 24 in the fissures 22. In certain embodiments, a secondary conduit 26 defining a return space 28 is located within the casing 16. In such configurations, a second annular space 30 is formed between the casing 16 and the secondary conduit 26. As will be readily appreciated, the casing with the inner secondary conduit will form during operation a closed loop working fluid conduit in which working fluid is being circulated.

In some embodiments, it is preferred (but not necessary) that placing the slurry composition is performed in a reverse circulation as indicated in FIG. 1 (and as is, for example, described in PROCEEDINGS, Thirty-Fifth Workshop on Geothermal Reservoir Engineering, Stanford University, Stanford, California, Feb. 1-3, 2010, incorporated by reference herein). For example, as shown in FIG. 1, slurry 14A will be fed through the annular space 18 to the annular space and fissures 22 at the target location (typically the terminal portion of the wellbore), and at least some of the slurry will exit the target location upwards through the inner return conduit 26 (typically through a valve or other fluid control structure, not shown). As such, it should be noted that by such placement the slurry in the fissures and the annular space at the target location will be contiguous and therefore provide a continuous path for heat transfer.

It should further be appreciated that the inner return conduit 26 forms a fluid path 28 for the hot working fluid once the power generation system is in operation. The space between the casing 16 and the inner return conduit 26 forms fluid path 30 that conveys the working fluid to the target location once the power generation system is in operation. Therefore, it should be noted that the fluid path 30 can be used to 'flush out' residual slurry in the inner return conduit 26 as is shown in FIG. 2. Direction of the working fluid from fluid path 30 to 28 can be done through a valve or other fluid control structure (e.g., using a stinger and flapper valve at the end of the tube-in-tube conduit, not shown).

Figure 3:
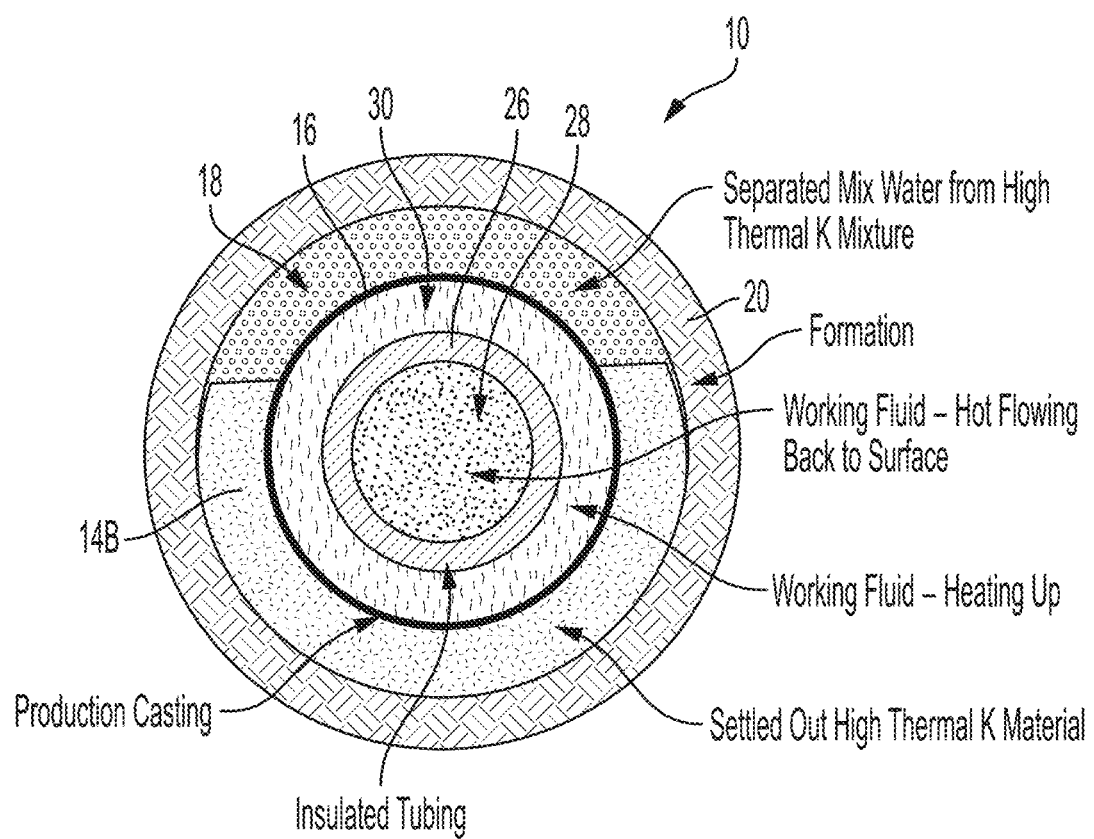
FIG. 3 is a schematic view illustrating an embodiment of the wellbore and casing of FIG. 1 located in the geothermal well.
Figure 4:
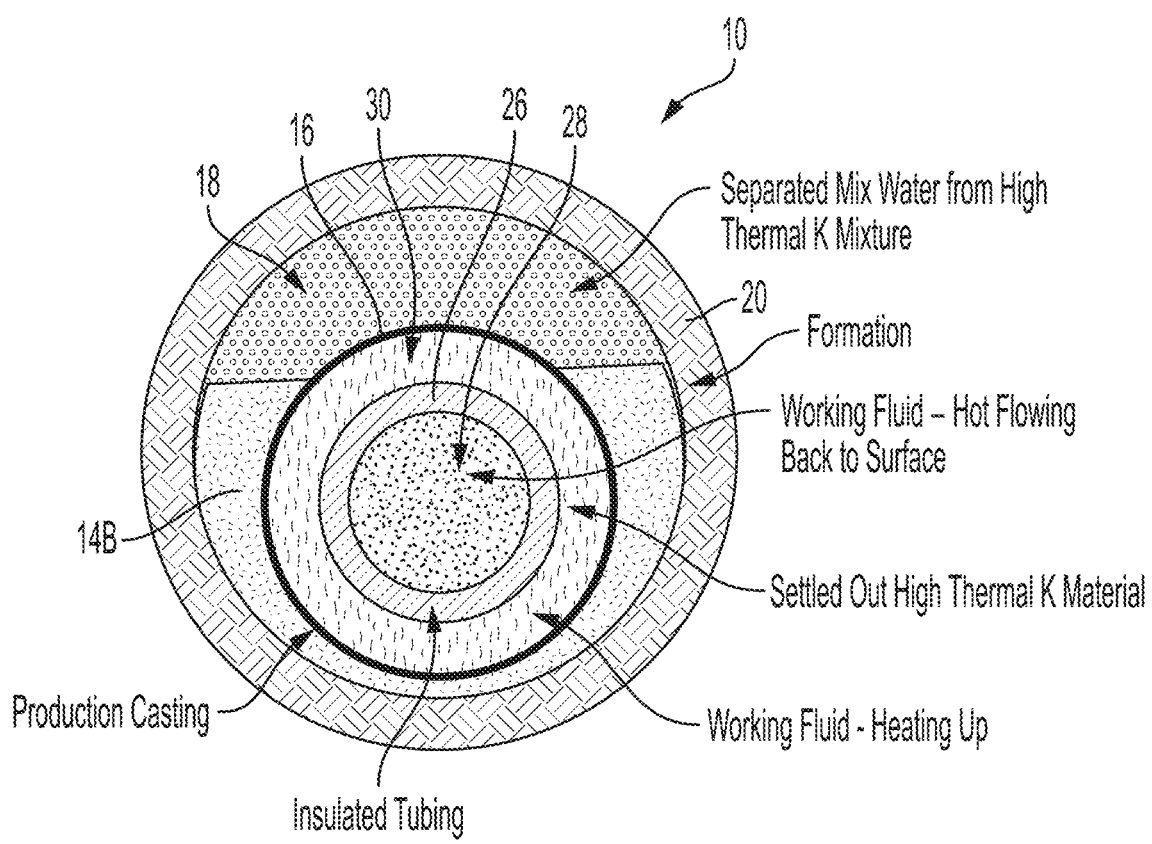
FIG. 4 is a schematic view illustrating another embodiment of the wellbore and casing of FIG. 1 located in the geothermal well.
Figure 5:
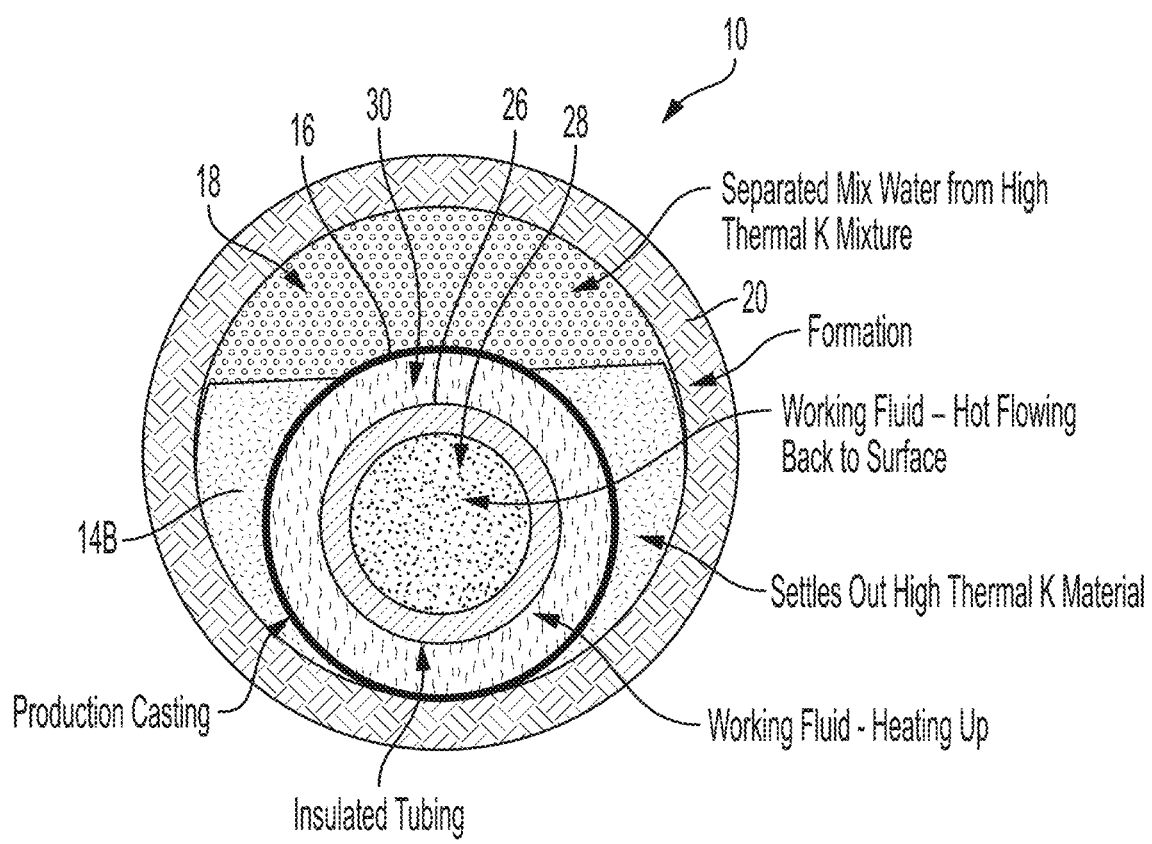
FIG. 5 is a schematic view illustrating still another embodiment of the wellbore and casing of FIG. 1 located in the geothermal well.

FIGS. 3-5 are schematic views illustrating embodiments of the casing 16 located in the geothermal well 10 where the well has a non-vertical direction (deviated relative to normal). The casing 16 may be located in any manner known in the art for geothermal wells. In one embodiment, the casing 16 is centered within the wellbore 12 (FIG. 3). In another embodiment, the casing 16 is partially offset within the wellbore 12 (FIG. 4). In another embodiment, the casing 16 is fully offset within the wellbore 12 (FIG. 5). Advantageously, and as shown in FIGS. 3-5, regardless of the placement of the casing 16, the casing 16 remains at least partially encased by the high-thermal conductivity composition 14B. With respect to the remaining numerals in FIGS. 3-5, the same numbers refer to the same components as already identified in FIGS. 1-2.

In certain embodiments, the target location extends in a substantially vertical orientation. The term "substantially" as utilized herein means that the target location extends toward the center of the earth but may be offset from the center by no greater than 15 degrees, no greater than 10 degrees, no greater than 5 degrees, or no greater than 1 degree. It is to be appreciated that the geothermal well 10 may have multiple target locations and thus may have both substantially vertical orientated target locations and target locations extending in orientations that are at least 30 degrees.

In view of the foregoing, the inventors contemplate various methods of installing the high-thermal conductivity composition 14B in the wellbore 12. In one example, the method may include a step of pumping the pumpable slurry 14A to a target location within the wellbore 12 having a target temperature of at least 200° C., at least 300° C., at least 350° C., at least 400° C., at least 450° C., or at least 500° C. The target location may be below ground at least 500 feet, at least 600 feet, at least 700 feet, at least 800 feet, at least 900 feet, at least 1,000 feet, at least 1,250 feet, at least 1,500 feet, at least 1,750 feet, at least 2,000 feet, at least 2,500 feet, at least 3,000 feet, at least 4,000 feet, or at least 5,000 feet. In these and other embodiments, the pumpable slurry 14A is routed into the annular space 18 between the wellbore 12 and the casing 16 located in the wellbore 12, thereby displacing a fluid in the annular space 18. Most typically, the target location is a dry and hot rock formation that will in most cases have low or no significant permeability (e.g., intrusive igneous or metamorphic rock).

In various embodiments, the pumpable slurry 14A requires agitation (e.g., utilized a static mixer, a rotary mixer, or a re-circulation jet mixer) prior to pumping the pumpable slurry 14A into the wellbore 12. For example, batch mixers may provide continuous agitation prior to pumping the pumpable slurry 14A into the wellbore 12 to keep it fluidized and suspended. Then, the pumpable slurry 14A may be fed to a pump that pumps the pumpable slurry 14A into the wellbore 12. In various embodiments, the pumpable slurry 14A is routed into the annular space 18 between the wellbore 12 and the casing 16 located in the wellbore 12, thereby displacing a fluid in the annular space 18.

Contemplated methods may also include a further step of removing displaced fluid through return space 28 located within the casing 16. The fluid may be removed using any process or apparatus known in the art for removing fluids. In various embodiments, the displaced fluid is removed through the return space 28 uses a secondary fluid that moves from the second annular space 30 to the return space 28. In further embodiments, contemplated methods will also include a step of allowing the pumpable slurry 14A to settle or compact in at least a portion of the annular space 18 and fissures 22 to thereby form the high-thermal conductivity composition 14B in the wellbore 12. The pumpable slurry 14A is pumped in place and after placement allowed at least partial compaction of the pumpable slurry 14A at the target location to form the high-thermal conductivity composition 14B and 24 in the wellbore 12 and fissures 22, respectively.

With further reference to FIG. 2, during power generating operation of the geothermal well 10, a working fluid will move in a closed loop working fluid conduit (formed in part by casing 16 and inner conduit 26) through the second annular space 30 and return to the surface through the return space 28. However, it is to be appreciated that the flow of working fluid may also be reversed. As the working fluid moves through the second annular space 30, geothermal heat from the target location conducted by the high-thermal conductivity composition 14B and the high-thermal k material 24 in the fissures 22 is transferred to the working fluid, thereby increasing the temperature of the working fluid. The working fluid then moves through the return space 28 toward the surface. A heat exchanger and turbine generator (both not shown) may be located proximate to the geothermal well 10 that is capable of utilizing the temperature of the working fluid to generate electrical energy.

Tables 1-6 describe exemplary high-thermal conductivity slurry compositions suitable for use herein. However, it should be appreciated that these compositions are merely provided to illustrate certain aspects of the inventive subject matter and are not intended to limit the scope of the inventive subject matter.

TABLE 1

| Ingredient | Function | Quantity (wt %) | Target Temp. | Therm. Cond. |
|---|---|---|---|---|
| Water | Fluidizer/carrier | 100% | 100-900° F. | 1-14[2] W/m° K |
| Silicon Carbide | High Thermal K Material | 535% bwow[1] (50-1000%) | | |
| Dispersant | Dispersant | 0.3% (0-4%) | | |
| Defoamer | Defoamer | 0-2% bwow[1] | | |
| Soap | Water wetting surfactant | 0-5% bwow | | |

[1]Bwow = By Weight of Water
[2]Thermal K values are estimates based on preliminary testing

TABLE 2

| Ingredient | Function | Quantity (wt %) | Target Temp. | Therm. Cond. |
|---|---|---|---|---|
| Water | Fluidizer/carrier | 100% | 100-900° F. | 1-14[2] W/m° K |
| Graphite | High Thermal K Material | 25-350% bwow[1] | | |
| Dispersant | Dispersant | 0-5% bwow[1] | | |
| Defoamer | Defoamer | 0-2% bwow[1] | | |
| Soap | Water Wetting Surfactant | 0-5% bwow[1] | | |

[1]Bwow = By Weight of Water
[2]Thermal K values are estimates based on preliminary testing

TABLE 3

| Ingredient | Function | Quantity (wt %) | Target Temp. | Therm. Cond. |
|---|---|---|---|---|
| Water | Fluidizer/carrier | 100% | 100-900° F. | 1-14[2] W/m° K |
| Graphite | High Thermal K Material | 124% bwow[1] | | |
| Dispersant | Dispersant | 0.5% bwow[1] | | |
| Defoamer | Defoamer | 0-2% bwow[1] | | |
| Soap | Water Wetting Surfactant | 1.0% bwow | | |

[1]Bwow = By Weight of Water
[2]Thermal K values are estimates based on preliminary testing

TABLE 4

| Ingredient | Function | Quantity (wt %) | Target Temp. | Therm. Cond. |
|---|---|---|---|---|
| Water | Fluidizer/carrier | 100% | 100-900° F. | 1-14[2] W/m° K |
| Graphite | High Thermal K Material | 0-350% bwow[1] | | |
| Silicon Carbide | High Thermal K Material | 0-600% | | |
| Defoamer | Defoamer | 0-3% bwow[1] | | |
| Soap | Water Wetting Surfactant | 0-2% bwow[1] | | |
| Dispersant | | 0% (0-4%) | | |

[1]Bwow = By Weight of Water
[2]Thermal K values are estimates based on preliminary testing

TABLE 5

| Ingredient | Function | Quantity (wt %) | Target Temp. | Therm. Cond. |
|---|---|---|---|---|
| Water | Fluidizer/carrier | 100% | 100-900° F. | 1-14[2] W/m° K |
| 800 Grit Silicon Carbide | High Thermal K Material | 30% bwow[1] | | |
| 600 Grit Silicon Carbide | High Thermal K Material | 30% bwow[1] | | |
| 325 Grit Silicon Carbide | High Thermal K Material | 150% bwow[1] | | |
| 180 Grit Silicon Carbide | High Thermal K Material | 150% bwow[1] | | |
| 90 Grit Silicon Carbide | High Thermal K Material | 175% bwow[1] | | |
| Xanthan Gum | Suspension Material | 0.1% bwow[1] | | |
| Defoamer | Defoamer | 1% bwow[1] | | |
| Soap | Water wetting surfactant | 0.3% bwow | | |

[1]Bwow = By Weight of Water
[2]Thermal K values are estimates based on preliminary testing

TABLE 6

| Ingredient | Function | Quantity (wt %) | Target Temp. | Therm. Cond. |
|---|---|---|---|---|
| Water | Fluidizer/carrier | 100% | 100-900° F. | 1-14[2] W/m° K |
| 800 Grit Silicon Carbide | High Thermal K Material | 10% bwow[1] | | |
| 600 Grit Silicon Carbide | High Thermal K Material | 10% bwow[1] | | |
| 325 Grit Silicon Carbide | High Thermal K Material | 10% bwow[1] | | |
| 90 Grit Silicon Carbide | High Thermal K Material | 75% bwow[1] | | |
| 54 Grit Silicon Carbide | High Thermal K Material | 50% bwow[1] | | |
| 24 Grit Silicon Carbide | High Thermal K Material | 150% bwow[1] | | |
| Graphite | High Thermal K Material | 250% bwow[1] | | |
| Xanthan Gum | Suspension Material | 0.1% bwow[1] | | |
| Defoamer | Defoamer | 1% bwow[1] | | |
| Soap | Water wetting surfactant | 0.3% bwow | | |

[1]Bwow = By Weight of Water
[2]Thermal K values are estimates based on preliminary testing In still further contemplated aspects, and particularly where the slurry is being installed at target locations with relatively high temperatures (e.g., at least 250° C., or at least 275° C., or at least 300° C., or at least 325° C., or at least 350° C.) and/or where the slurry is surrounded by dry (and possibly porous) rock, the inventors consider that at least partial dehydration of the heat transfer slurry system may reduce thermal conductivity. To mitigate this risk after placement of the non-cementitious slurry, the inventors contemplate continuous or intermittent injection of water under pressure from the surface into the annulus between the casing of the closed loop circuit and the larger casing or well in which the casing is placed. Alternatively, water may also be provided to the target location via one or more dedicated conduits that extend to or into the compacted or settled non-cementitious high-thermal conductivity composition Depending on the porosity of the settled or compacted slurry, such replenishment of water lost to the formation or evaporation may maintain or improve thermal conductivity of the settled or compacted slurry without further intervention and as such help maintain peak thermal efficiency of the system. Alternatively, or additionally, where the settled or compacted slurry has very low porosity (or permeability of water), it is contemplated that the slurry composition can be adjusted so that the permeability is increased or decreased as needed to achieve the needed flow rate of the water from surface to depth. As will be readily appreciated, such adjustment will depend on the projected rate of loss of hydration, the porosity of the surrounding formation, the temperature, etc., and the skilled artisan will be readily able to adjust the water permeability following quantitative protocols as can be found, for example, in ASTM D4630-19.

Thus, in at least some embodiments, the non-cementitious high-thermal conductivity composition will have a permeability for water that allows penetration of the water throughout at least 50%, or at least 60%, or at least 70%, or at least 75%, or at least 80%, or at least 85%, or at least 90% of the compacted or settled non-cementitious high-thermal conductivity composition. Consequently, a potential loss of thermal conductivity after at least 1 year, or at least 3 years, or at least 5 years, or at least 7 years, or at least 10 years (as compared to thermal conductivity immediately after installation) will be less than 30%, or less than 25%, or less than 20%, or less than 15%, or less than 10, or even lower.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A non-cementitious high-thermal conductivity slurry composition, comprising:
    a high-thermal k material and an optional dispersant, wherein the high thermal k material is in form of a plurality of particles having a wide size distribution;
    wherein the wide size distribution spans across at least 2 log units;
    wherein the high-thermal k material is present in an amount effective such that the slurry composition has, upon compaction or settling of a slurry mixture at a target location, a thermal conductivity of at least 3 W/m° K; and
    wherein the slurry mixture is substantially free of curable materials.

2. The composition of claim 1, wherein the slurry composition further comprises at least one functional agent selected from the group consisting of a plasticizer, a surfactant, an organic polymer, a silica filler, a NaCl or KCl or other inorganic salt, and a clay.

3. The composition of claim 1, wherein the wide size distribution spans across at least 3 log units or is between 0.1 μm and 5.0 mm.

4. The composition of claim 1, wherein the high-thermal k material is selected from the group consisting of graphite powder, flaked graphite, pyrolytic graphite, desulfurized petroleum coke, graphene, fly ash, copper powder, aluminum nitride, and silicon carbide.

5. The composition of claim 1, wherein the high-thermal k material is present in the slurry mixture in an amount of at least 10 wt %.

6. The composition of claim 1, wherein the high-thermal k material is present in an amount effective such that the slurry mixture has, upon compaction or settling at the target location, a thermal conductivity of at least 4 W/m° K.

7. The composition of claim 1, wherein the slurry mixture has upon addition of water a sedimentation rate of the plurality of particles that allows pumping the slurry mixture to the target location without substantial settling of the particles before reaching the target location.

8. The composition of claim 7 having, upon addition of the water, a density of between 10 and 30 lb/gal and/or a water content of between 1 and 20 gal/100 lbs of high thermal k material.

9. A method of producing a pumpable slurry mixture, comprising:
    combining the high-thermal conductivity slurry composition of claim 1 with a quantity of water; and mixing the water with the high-thermal conductivity slurry composition to thereby form the pumpable slurry mixture;

wherein the quantity of water is sufficient to generate a slurry density of between 10 and 30 lb/gal.

10. The method of claim 9, further comprising a step of feeding the pumpable slurry to a pump that pumps the slurry into a wellbore.

11. The method of claim 10, wherein the step of pumping the slurry into the wellbore is performed at a rate that allows at least partial compaction or settling of the slurry mixture at the target location.

12. A method of installing a high-thermal conductivity mixture in a wellbore, comprising:

pumping a pumpable slurry comprising the non-cementitious high-thermal conductivity slurry composition of claim 1 to a target location having a target temperature of at least 200° C.;

wherein the pumpable slurry is routed into an annular space between the wellbore and a casing located in the wellbore, thereby displacing a fluid in the annular space;

removing the displaced fluid through a return space located within the casing; and allowing the pumpable slurry to compact in at least a portion of the annular space to thereby form the high-thermal conductivity composition in the wellbore, wherein the high-thermal conductivity composition is in thermal exchange with at least a portion of the casing and at least a portion of a formation surrounding the wellbore;

wherein the pumpable slurry is pumped in place and after placement allowed at least partial compaction or settling of the slurry at the target location.

13. The method of claim 1 wherein the target location is at least 3,000 ft below ground and extends in a substantially vertical orientation.

14. The method of claim 12, wherein the return space located within the casing is enclosed in a secondary conduit that is located within the casing, and wherein a second annular space is formed between the casing and the secondary conduit.

15. The method of claim 12, wherein the step of removing the displaced fluid through the return space uses a secondary fluid that moves from the second annular space to the return space.

16. The method of claim 12, wherein the formation includes a plurality of fissures that are at least partially filled with a high-thermal conductivity material, and wherein the high-thermal conductivity material in the fissures is in thermal exchange with the compacted high-thermal conductivity composition in the wellbore.

17. The method of claim 16, wherein the high-thermal conductivity material in the fissures is selected from the group consisting of graphite powder, flaked graphite, pyrolytic graphite, desulfurized petroleum coke, graphene, fly ash, copper powder, aluminum nitride, and silicon carbide.

18. The method of claim 12, further comprising a step of pumping water to the at least partially compacted or settled slurry at the target location after the slurry has compacted or settled to maintain or increase thermal conductivity of the compacted or settled slurry at the target location.

19. A method of reducing loss of thermal conductivity of a non-cementitious high-thermal conductivity composition in a wellbore, comprising:

providing in situ water to the non-cementitious high-thermal conductivity composition, wherein the non-cementitious high-thermal conductivity composition has compacted or settled at a target location and does not exhibit hardening or curing;

wherein the water is provided through an annular space between a casing of a closed loop circuit and a well wall or well casing; and wherein the water is provided in an amount sufficient to reduce loss of thermal conductivity of the non-cementitious high-thermal conductivity composition relative to a time of placement of the non-cementitious high-thermal conductivity composition.

20. The method of claim 19, wherein the non-cementitious high-thermal conductivity composition has a permeability for water that allows penetration of the water throughout at least 75% of the compacted or settled non-cementitious high-thermal conductivity composition.

* * * * *